(No Model.)
E. SIMON.
Handle for Satchels, Bags, &c.
No. 229,481.        Patented June 29, 1880.
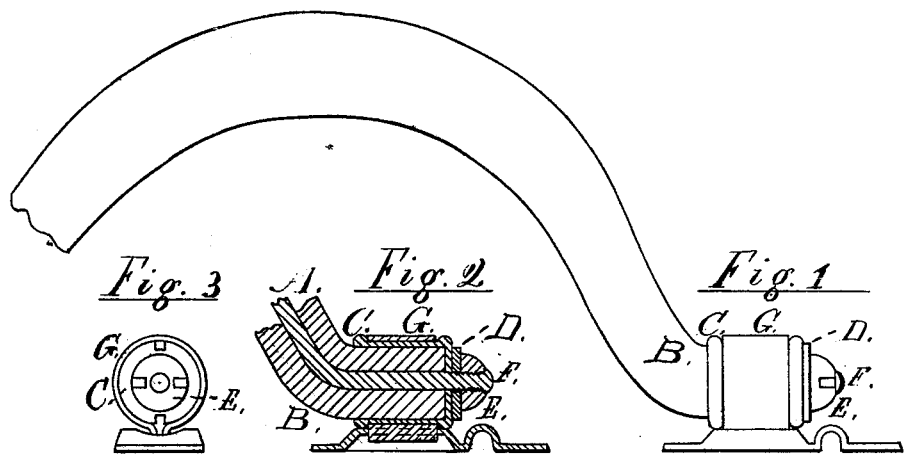
Attest:
Joseph N. Eno
Disbrough Soden
Inventor.
Edward Simon
By Horace Harris
Atty

UNITED STATES PATENT OFFICE.

EDWARD SIMON, OF NEWARK, NEW JERSEY.

HANDLE FOR SATCHELS, BAGS, &c.

SPECIFICATION forming part of Letters Patent No. 229,481, dated June 29, 1880.

Application filed May 13, 1880. (No model.)

*To all whom it may concern:*

Be it known that I, EDWARD SIMON, of Newark, in the county of Essex and State of New Jersey, have invented a new and useful Improvement in Satchel, Bag, and Valise Handles, of which the following is a specification.

My invention relates to the method of fastening on the handles of satchels, bags, and valises, naming a bag only as a representative article, as the invention applies equally well to all; and it consists in a lock-nut device, in addition to devices previously used, making an improvement on said devices.

Figure 1 is a side elevation, and Fig. 2 is a longitudinal section, of one end of a handle. Figs. 3, 4, and 5 are detailed views.

In the former construction the wire shank A of the handle B passed through the handle-cap C, and was secured by a small nut, which was very liable to scratch and unduly press and damage the tin plate forming the end of the handle-cap C, and very liable, also, to work off. In the place of that small nut I use a washer-nut, D, having nearly the diameter of the handle-cap, protecting the end of the handle-cap; and outside of that, on the end of the shank, I screw a nut, E, making a lock-nut connection with the washer-nut, which it was found would ordinarily keep its position; but as an additional security the end F of the shank is riveted down on the end of the nut E; and if in use the handle becomes too loose, turning in the clasp-strap G, the nuts D and E will be screwed up, and the end of the shank be further riveted down to take up the longitudinal play.

In this way I provide that the nuts shall never come off; and I provide, also, for tightening up the handle when, through wear, it becomes loose.

The lock-nut by itself is not new; but a bag-handle so secured, with the addition of the riveting, is believed to be, and it is, an important improvement in the state of the art in fastening on handles.

I claim—

As an improvement in handle attachments to satchels, bags, &c., the metallic core A of a handle, screw-threaded at its ends, in combination with the washer-nut D and lock-nut E, secured in place by heading or upsetting the ends of said core, all substantially as set forth.

EDWARD SIMON.

Witnesses:
HORACE HARRIS,
JOSEPH A. ENO.